(12) United States Patent
Peacock et al.

(10) Patent No.: US 8,148,489 B2
(45) Date of Patent: Apr. 3, 2012

(54) THERMOPLASTIC RESINS CONTAINING PBT UNITS, HAVING REDUCED ORGANIC CARBON EMISSIONS

(75) Inventors: Judith Alison Peacock, Vaud (CH); David J. Wrigley, Athenaz (CH)

(73) Assignee: E. I. du Pont De Nemours and Company, Wilmington, DE (US)

( * ) Notice: Subject to any disclaimer, the term of this patent is extended or adjusted under 35 U.S.C. 154(b) by 411 days.

(21) Appl. No.: 11/724,454

(22) Filed: Mar. 15, 2007

(65) Prior Publication Data
US 2007/0225475 A1 Sep. 27, 2007

Related U.S. Application Data

(60) Provisional application No. 60/785,427, filed on Mar. 24, 2006.

(51) Int. Cl.
*C08G 63/00* (2006.01)

(52) U.S. Cl. ........ 528/286; 528/272; 528/279; 528/300; 502/102; 502/150; 502/162

(58) Field of Classification Search .................. 528/272, 528/274, 275, 279, 286, 302, 308, 308.3, 528/271, 300; 502/208, 150, 162, 170, 102
See application file for complete search history.

(56) References Cited

U.S. PATENT DOCUMENTS

| 4,131,595 A | | 12/1978 | Breitenfellner et al. |
| 5,789,528 A | * | 8/1998 | Martl et al. .................... 528/279 |
| 2002/0165336 A1 | * | 11/2002 | Duan et al. .................... 528/272 |
| 2005/0215425 A1 | | 9/2005 | Clair et al. |

FOREIGN PATENT DOCUMENTS

| EP | 0 683 201 A1 | 5/1994 |
| EP | 683 201 A1 | 11/1995 |
| EP | 1 571 171 A1 | 9/2005 |

OTHER PUBLICATIONS

Modern Polyesters: Chemistry and Technology of Polyesters and Copolyesters, Wiley Series in Polymer Science, John Wiley & sons, Ltd.
Th. Rieckmann and S. Volker, Poly(ethylene Terephthalate), pp. 58-65.

* cited by examiner

Primary Examiner — James J Seidleck
Assistant Examiner — Frances Tischler

(57) ABSTRACT

A method for reducing organic carbon emissions from PBT-block-containing resins is disclosed. The method involves adding a titanium-catalyst deactivating compound to the resin after polymerisation.

11 Claims, No Drawings

THERMOPLASTIC RESINS CONTAINING PBT UNITS, HAVING REDUCED ORGANIC CARBON EMISSIONS

CROSS REFERENCE TO RELATED APPLICATIONS

This application claims the benefit of U.S. Provisional Application No. 60/785,427, filed Mar. 24, 2006.

FIELD OF THE INVENTION

The invention relates to the field of thermoplastic polymers, particularly thermoplastic polymers containing polybutyleneterephthalate (PBT) repeat units.

BACKGROUND OF THE INVENTION

Thermoplastic resins having a polybutylene terephthalate (PBT) component, such as PBT itself and copolyetherester elastomers having PBT blocks, are used increasingly as engineering polymers in diverse end uses, including the automotive industry. Such resins may in particular be used in automobile interiors. Copolyetherester elastomers, for example, are widely used in air-bag deployment doors.

Many thermoplastic resins suffer the disadvantage that moulded articles made from the resins exhibit a phenomenon known as outgassing. Outgassing is the emission of organic molecules of relatively low molecular weight into the surrounding environment. Outgassing is considered disadvantageous because many of the components that are emitted have unpleasant odours, or may be irritants. PBT-containing resins are particularly prone to emit tetrahydrofuran (THF), particularly within the first weeks after moulding. Outgassing is usually worsened if the resin is used under conditions of elevated temperature (i.e. above 100° C.). Automobile manufacturers are adopting increasingly strict requirements as regards to outgassing in automobile interiors.

European patent no. EP 0 683 201 (Polyplastics Co. Ltd.) describes a method for reducing gas (particularly THF) in moulded articles made of PBT. The method involves adding a compound of Formula I, II or III during polymerisation of the monomers to make PBT:

(I)

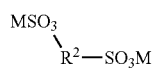

(II)

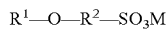

(III)

A need remains for methods for reducing outgassing in PBT-containing thermoplastic resins.

SUMMARY OF THE INVENTION

In a first aspect, the invention provides a method or process for reducing outgassing in a resin comprising at least one component having a polybutylene terephthalate (PBT) repeat unit, which resin is made by polymerising monomers in the presence of a titanium catalyst, the method or process comprising the step of: adding to the resin, after polymerisation of the monomers, a titanium catalyst deactivating compound.

In a second aspect, the invention provides a use of a titanium catalyst deactivating compound for reducing outgassing in a resin comprising at least one component having a polybutylene terephthalate (PBT) repeat unit, which resin is made by polymerising monomers in the presence of a titanium catalyst.

In a third aspect, the invention provides a resin comprising at least one component having a polybutylene terephthalate (PBT) repeat unit, the resin further comprising at or about 0.01 to 3 wt % of the compound of Formula IV″:

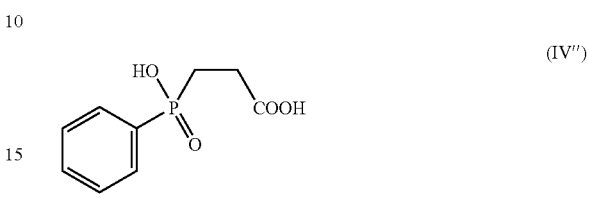

(IV″)

or at or about 0.01 to 3 wt % phenyl phosphinate, or at or about 0.01 to 3 wt % of a salt (preferably sodium) of 2,2'-methylenebis-(4,6-di-tert-butylphenyl)phosphate.

In a fourth aspect, the invention provides a moulded, extruded or shaped article made from a resin comprising at least one component having a polybutylene terephthalate (PBT) repeat unit, the resin further comprising at or about 0.01 to 3 wt % of the compound of Formula IV″:

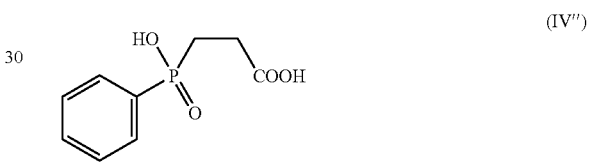

(IV″)

or at or about 0.01 to 3 wt % phenyl phosphinate, or at or about 0.01 to 3 wt % of a salt (preferably sodium) of 2,2'-methylenebis-(4,6-di-tert-butylphenyl)phosphate.

DETAILED DESCRIPTION OF PREFERRED EMBODIMENTS

Abbreviations
PBT: polybutylene terephthalate
THF: tetrahydrofuran
PPG: polypropylene glycol
PEG: polyethylene glycol
TOC: total organic carbon emissions
GC-MS: gas chromatography-mass spectrometry
3HPP: 3-(hydroxyphenyl phosphinyl)propanoic acid The inventors have surprisingly found that total organic carbon emissions (TOC), and in particular tetrahydrofuran (THF) emissions can be reduced in a resin comprising at least one component having a polybutylene terephthalate (PBT) repeat unit, which resin is made by polymerising monomers in the presence of a titanium catalyst, by adding to the resin, after polymerisation of the monomers, a titanium catalyst deactivating compound. Resins prepared by the method of the invention show a reduction in THF emissions shortly after melt forming.

Outgassing in the context of the present description refers to the emission of volatile organic substances from a resin, which substances can be detected, for example, according to the method of the Verband der Automobilindustrie [The German Association of the Automotive Industry (VDA)] standard VDA 277. In particular it refers to the emission of THF, which is a particular problem immediately after moulding, extruding or shaping of a resin comprising a PBT repeat unit. THF emissions from a resin may be measured, for example, using gas chromatography, for example with flame ionisation detection, or gas chromatography-mass spectrometry (GC-MS). Even though THF emission from resins decreases within the first few weeks after moulding, extruding or shaping, the emission is perceived as a problem, particularly in the automotive industry, in which car interiors must satisfy rigorous emission standards and smell requirements.

Thermoplastic resins comprising a PBT repeat unit are made by polymerising monomers (e.g. 1,4-butanediol and a terephthalate diester and/or isophthalate diester) in the melt in the presence of a catalyst, often a titanium catalyst, such as titanium tetra(t-butoxide), used either alone, or in the presence of other metal salt catalysts. With a conventional resin, after polymerisation is complete, the resin is removed from the polymerisation vessel, the resin solidifies, and the titanium catalyst remains in active form in the solid resin at concentrations of from at or about 10 to 1000 ppm titanium (mass titanium to mass polymer). While not wishing to be limited by theory, it is believed that the titanium catalyst can catalyse the formation of outgassing components such as THF when the resin is in the melt, for example on remelting for moulding, extrusion or shaping. By adding a titanium catalyst deactivating compound to the resin comprising a PBT repeat unit, the activity of the titanium catalyst is reduced. It is believed that this results in reduced outgassing of the solidified resin, particularly emission of THF.

The expression "titanium-catalyst deactivating compound" is meant to encompass all those compounds that when added to an active titanium catalyst result in a decrease of the titanium catalyst's polymerisation activity.

The expression "after polymerisation of the monomers", is used to describe the point in the process of manufacturing the resin that the titanium catalyst deactivating compound (e.g. a compound of Formula IV, IV' or IV") is added. The expression is meant to encompass any point in time at or about which or after which the condensation polymerisation reaction has resulted in a polymer with the desired molecular weight and viscosity. The desired molecular weight and viscosity are selected to meet the subsequent use requirements of the resin.

Particular examples of the resin comprising at least one component having a polybutylene terephthalate (PBT) repeat unit include: PBT, copolyether ester elastomers having PBT segments, co-PBT's (i.e. PBT's in which some of the 1,4-butane diol is replaced with, for example, one or more other diols, such as aliphatic, cycloaliphatic (for example 1,4-cyclohexanedimethanol), or aromatic diols (for example 2,2-bis[4-(hydroxyethoxyphenyl)]-propane as disclosed in U.S. Pat. No. 4,066,607, incorporated herein by reference) or the terephthalate group is replaced by the residue of other diacids such as isophthalic acid or adipic acid (as disclosed, for example, in U.S. Pat. No. 4,131,595, incorporated herein by reference).), and blends of any of these. Particularly preferred are PBT and copolyether ester elastomers having PBT segments, such as those available under the tradenames Hytrel® (Dupont), Arnitel® (DSM) and Riteflex® (Ticona).

The titanium catalyst deactivating compound is preferably a compound of the general Formula IV, or salts thereof:

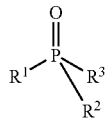

(IV)

wherein $R^1$, $R^2$ and $R^3$ are independently selected from H, OH, OM (wherein M is a positively charged counterion), optionally substituted $C_{1-20}$ alkyl, optionally substituted $C_{2-10}$ alkylene, optionally substituted $C_{6-20}$aryl, optionally substituted $C_{1-20}$ alkyloxy, polyoxy($C_{2-4}$)alkylene, and optionally substituted $C_{6-20}$aryloxy, and wherein the optional substituents are independently 1 to 2 in number on any of $R^1$, $R^2$ and $R^3$, and are independently selected from OH, halogen, COOH, $COOR^4$ (wherein $R^4$ is $C_{1-4}$ alkyl) and $NH_2$;

two or more of $R^1$, $R^2$ and $R^3$ can optionally be linked together by a bridge; with the proviso that $R^1$, $R^2$ and $R^3$ are not simultaneously H, and that $R^1$, $R^2$ and $R^3$ are not simultaneously OH.

More preferably, the titanium catalyst deactivating compound is a compound of the general Formula IV', or salts thereof:

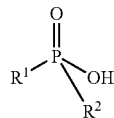

(IV')

wherein $R^1$ and $R^2$ are independently selected from H, OH, OM (wherein M is a positively charged counterion), optionally substituted $C_{1-20}$ alkyl, optionally substituted $C_{2-20}$ alkylene, optionally substituted $C_{6-10}$aryl, optionally substituted $C_{1-20}$ alkyloxy, polyoxy($C_{2-4}$)alkylene, and optionally substituted $C_{6-20}$aryloxy, and wherein the optional substituents are independently 1 to 2 in number on either of $R^1$ or $R^2$, and are independently selected from OH, halogen, COOH, $COOR^4$ (wherein $R^4$ is $C_{1-4}$ alkyl) and $NH_2$;

two or more of $R^1$, $R^2$ and $R^3$ can optionally be linked together by a bridge; with the proviso that $R^1$ and $R^2$ are not simultaneously OH.

Salts of compounds of Formula IV, IV' and IV" may be any acid or base addition salts, such as sodium salts, potassium salts, calcium salts, magnesium salts, barium salts, aluminium salts, tetraalkylammonium salts (e.g. tetrabutylammonium), hydrochloride salts, sulphate salts, oxalate salts, $C_{2-6}$ carboxylate salts (e.g. acetate, propionate), and the like. Preferably when $R^1$ and/or $R^2$ and/or $R^3$ are OH, the OH group is in the form of a salt of $Na^+$, $K^+$, $Ca^{++}$, $Mg^{++}$ or $Al^{+++}$, since acidic compounds may degrade the PBT repeat units.

In a preferred embodiment, $R^1$ in the compound of Formula IV or IV' is selected from phenyl, ethyl, H, 2-(carboxy)ethyl, polyoxyethylene, hydroxymethyl, di-t-butoxyphenoxy, and ethoxy.

In a further preferred embodiment, in particular in combination with the preferred embodiment recited in the paragraph directly above, $R^2$ in the compound of Formula IV or IV' is selected from phenyl, ethyl, H, 2-(carboxy)ethyl, polyoxyethylene, hydroxymethyl, di-t-butoxyphenoxy, and ethoxy.

In those compounds in which two or more of $R^1$, $R^2$ and $R^3$ are linked together by a bridge other than the P atom, the bridge is preferably $C_1$-$C_4$ alkylene, more preferably ethylene or methylene. Particularly preferred are such bridged compounds in which $R^1$ and $R^2$ are selected from optionally substituted aryloxy, wherein the aryloxy groups are linked by an ethylene or methylene bridge, particularly a methylene bridge. Particularly preferably the aryloxy groups are substituted, preferably with $C_1$-$C_4$-branched or unbranched alkyl.

Preferred examples of compounds of Formula IV are the following:

Phenyl phosphinate (preferably the sodium salt), preferably used at or about 0.03 to 0.4 wt %, more preferably at or about 0.05 to 0.2 wt %:

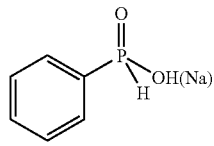

Sodium (or potassium) hypophosphite monohydrate, preferably used at or about 0.03 to 0.4 wt %, more preferably at or about 0.05 to 0.2 wt %:

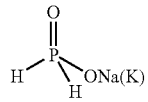

3-(hydroxyphenyl phosphinyl)propanoic acid ("3HPP"; compound of Formula IV"), preferably used at or about 0.05 to 0.8 wt %, more preferably at or about 0.1 to 0.5 wt %:

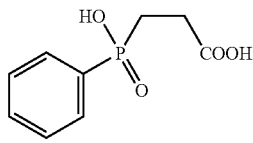

Mono-, di- and tri-salts of phosphoric acid (particularly the sodium salts), preferably used at or about 0.05 to 0.4 wt %, more preferably at or about 0.1 to 0.2 wt %.

Di(polyoxyethylene)hydroxymethylphosphonate [e.g. sold as Victastab HMP (Akzo Nobel)], preferably used at or about 0.03 to 0.4 wt %, more preferably at or about 0.05 to 0.2 wt %:

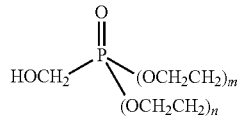

A salt (preferably sodium) of 2,2'-methylenebis-(4,6-di-tert-butylphenyl)phosphate, preferably used at or about 0.01 to 3 wt %, more preferably at or about 0.05 to 0.5 wt %:

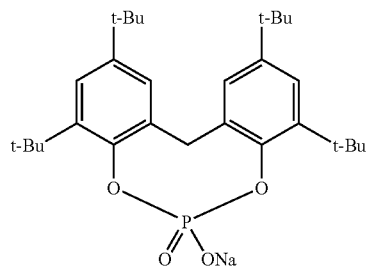

Salts of diethylphosphinic acid, in particular the aluminium salt (aluminium tris-diethylphosphinate), preferably used at or about 0.01 to 1 wt %, more preferably at or about 0.05 to 0.5 wt %

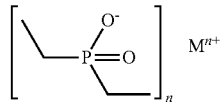

In a particularly preferred embodiment of the method or process of the invention, the titanium catalyst deactivating compound that is used is a compound of Formula IV" (3HPP):

or a salt (preferably sodium) of 2,2'-methylenebis-(4,6-di-tert-butylphenyl)phosphate, or the aluminium salt of diethyl phosphinic acid.

The method or process of the invention involves adding a titanium catalyst deactivating compound (e.g. a compound of Formula IV, IV' or IV") to the resin comprising at least one component having a polybutylene terephthalate (PBT) repeat unit in the melt. Since the titanium catalyst deactivating compound deactivates the titanium catalyst, it is added after polymerisation of the PBT monomers is complete. This may be done immediately after polymerisation (i.e. by direct addition to the polymer melt in the polymerisation vessel, once the polymerisation process has reached the desired stage). Alternatively, the titanium catalyst deactivating compound may be added in a separate process by remelting granules of the resin comprising at least one component having a polybutylene terephthalate (PBT) repeat unit and adding the titanium catalyst deactivating compound. In yet another embodiment of the invention, the polymerised resin comprising at least one component having a polybutylene terephthalate (PBT) repeat unit may be fed to a separate mixing apparatus (such as a single or twin-screw compounding extruder) immediately after polymerisation, for mixing with the titanium catalyst deactivating compound. The outgassing reduction is more efficient the greater the effectiveness of the mixing of the resin and the titanium catalyst deactivating compound. Preferably, the mixing of the resin and the titanium catalyst deactivating compound should be continued until the titanium catalyst deactivating compound is homogeneously distributed in the resin.

The titanium catalyst deactivating compound (e.g. a compound of Formula IV, IV' or IV") is usually added in a number of moles that is at least approximately stoichiometric to the number of moles of titanium catalyst that were used in the polymerisation of the resin. The titanium content (ppm in terms of mass of titanium per mass of polymer) is known from the amount of catalyst added at the start of polymerisation. Alternatively, it may be determined by analysing the resin, for example, by X-ray fluorescence (XRF) or atomic emission or absorption spectroscopy. In most cases, the titanium catalyst is present in an amount of at or about 10 to 1000 ppm (i.e. approximately 0.2 to 21 moles Ti per 1000 kg resin), commonly in the range of at or about 100 to 400 ppm (i.e. approximately 2 to 8 moles Ti per 1000 kg resin). In a preferred embodiment, the catalyst deactivating compound (e.g. a compound of Formula IV, IV' or IV") is added in an amount of at or about 0.5 to 20 equivalents (phosphorus atoms:titanium atoms), more preferably at or about 1 to 10 equivalents. For most titanium catalyst deactivating compounds (e.g. a compound of Formula IV, IV' or IV"), this works out to an amount of at or about 0.01 to 2 wt % with respect to the resin, more preferably at or about 0.05 to 1 wt % with respect to the resin.

Testing the resulting resin for outgassing may be done by a number of techniques. An example of a technique that may be used to evaluate total organic carbon emissions from a resin is described in the Verband der Automobilindustrie [The German Association of the Automotive Industry (VDA)] standard VDA 277.

EXAMPLE 1

Hytrel® 5556 is a copolyetherester elastomer available from DuPont. It has a nominal hardness of 55 Shore D and comprises hard segments of PBT with soft segments of polyether terephthalate and contains a titanium based catalyst at approximately 100 to 400 ppm (mass Ti to mass polymer; i.e. approximately 2 to 8 moles Ti per 1000 kg resin). For this experiment the batch used had a titanium content of approximately 150 ppm.

Hytrel® 5556 has a typical Melt Flow Rate (MFR) of approximately 7.5 g/10 min when measured to ISO1133 at 220° C. and with a load of 2.16 kg.

The Hytrel® 5556 was melt compounded in a twin screw extruder with various levels of compounds of general Formula IV as listed in Table 1. The control resin was Hytrel® 5556 put through the same compounding process but without the addition of a compound of Formula IV.

The inventive and control resins were injection moulded into bars of approximate overall dimensions of 75 mm×12.5 mm×2 mm, and of the form described as Test Specimen type 5A in the International Standard ISO 527-2: 1993(E). Immediately after moulding the bars were sealed in aluminium-lined polyethylene envelopes. The sealed envelopes maintain THF-content at approximately the level immediately after moulding until analysis can de done. For analysis, the bars were removed from the envelopes and cut into four pieces and placed in septum-sealed vials. The control sample and inventive samples were treated in exactly the same fashion throughout the sample preparation process.

Total Organic Carbon Emissions (TOC)

The vials containing the control and the inventive sample were heated for approximately 5 hours at 120° C. The "headspace" above the resin samples (i.e. the air space in the vials above the resin) was sampled, and injected into a gas chromatograph according to VDA 277. Detection was with a flame ionisation detector. The area under the peaks for the inventive sample was compared to the area under the peaks for the control, and the results reported as % TOC of control. The results are reported in Table 1 as "% TOC".

It is clear from the results reported in Table 1 that the addition of a compound of Formula IV to a PBT-block-containing resin results in reduction of total organic carbon emissions.

THF Emissions

Control and inventive samples were prepared as above. The vials containing the control and the inventive sample were heated for approximately 5 hours at 120° C. The "headspace" above the resin samples (i.e. the air space in the vials above the resin) were sampled, and injected into a gas chromatograph. Detection was with flame ionisation detection (mass spectrometry may also be used). The area under the peak for THF for the inventive sample was compared to the area under the peak for THF for the control, and the results reported as % THF of control. The results are reported in Table 1 as "% THF".

It is clear from the results reported in Table 1 that the addition of a compound of Formula IV to a PBT-block-containing resin results in reduction of THF emissions.

EXAMPLE 2

Crastin® 6131 is a PBT resin available from DuPont. It has an average melt flow rate (MFR) of 48 g/10 mins, ISO1133, 250° C., 2.16 kg and contains a titanium-based catalyst, at approximately 100 ppm (mass Ti to mass polymer; i.e. approximately 2 moles Ti per 1000 kg resin).

The Crastin® 6131 was melt compounded in a twin screw extruder with various levels of compounds of general Formula IV as listed in Table 2. The control resin was Crastin® 6131 put through the same compounding process but without the addition of a compound of Formula IV.

The inventive and control resins were injection moulded into plates of dimensions 80×80×3 mm. Immediately after moulding the bars were sealed in aluminium-lined polyethylene envelopes. The sealed envelopes maintain THF-content at approximately the level immediately after-moulding until analysis can de done. For analysis, the plates were removed from the envelopes and cut into pieces of approximately 4×4×3 mm. Approximately 1.5 g of these granules were placed in a septum-sealed vial. The control sample and inventive sample were treated in exactly the same fashion throughout the sample preparation process.

Total Organic Carbon Emissions (TOC)

Total organic carbon emissions were measured as above. The results are reported in Table 2 as "% TOC".

It is clear from the results reported in Table 2 that the addition of a compound of Formula IV to PBT results in reduction of total organic carbon emissions.

THF Emissions

THF emissions were measured as above. The results are reported in Table 2 as "% THF".

It is clear from the results reported in Table 2 that the addition of a compound of Formula IV to a PBT-block-containing resin results in reduction of THF emissions.

EXAMPLE 3

The procedure of example 2 was followed using, in place of the Crastin® 6131, a PBT resin with an average melt flow rate (MFR) of 48 g/10 mins, ISO1133, 250° C., 2.16 kg and containing a titanium-based catalyst, at approximately 170 ppm (mass Ti to mass polymer; i.e. approximately 3.5 moles Ti per 1000 kg resin). The results obtained are reported in Table 3

TABLE 1

TOC (% TOC; total organic carbon emissions) and THF emissions (% THF) for PBT-block containing copolyether ester elastomer resin (Hytrel ® 5556) containing a compound of Formrula IV, as a percentage of values for control resins without the compound of Formula IV

| Compound of Formula IV | Approximate molar ratio of P:Ti | % TOC | % THF |
|---|---|---|---|
| Sodium phenyl phosphinate | | | |
| 0.075 wt % | 1.4 | 49 | 37 |
| 0.15 wt % | 2.8 | 73 | 59 |
| 0.3 wt % | 5.6 | 92 | 74 |
| Sodium hypophosphite | | | |
| 0.05 wt % | 1.5 | 48 | 29 |
| 0.1 wt % | 2.9 | 54 | 34 |
| 0.2 wt % | 5.9 | 47 | 35 |
| 3HPP | | | |
| 0.2 wt % | 2.9 | 35 | 22 |
| 0.4 wt % | 5.7 | 44 | 34 |
| Disodium hydrogen phosphate (anhydrous) | | | |
| 0.13 wt % | 2.8 | 62 | 47 |
| Victastab HMP | | | |
| 0.33 wt % | 2.7 | 62 | 25 |
| Monosodium dihydrogen phosphate | | | |
| 0.11 wt % | 2.8 | 78 | 58 |
| Sodium 2,2'-methylenebis-(4,6-di-tert-butylphenyl)phosphate | | | |
| 0.1 wt % | 0.6 | 35 | 23 |
| 0.25 wt % | 1.6 | 57 | 44 |
| Aluminium tris-diethylphosphinate | | | |
| 0.1 wt % | 2.5 | 35 | 21 |
| 0.25 wt % | 6.1 | 44 | 30 |

TABLE 2

TOC (% TOC; total organic carbon emissions) and THF emissions (% THF) for PBT resin (Crastin ® 6131) containing a compound of Formula IV, as a percentage of values for control resins without the compound of Formula IV

| Compound of Formula IV | Approximate molar ratio of P:Ti | % TOC | % THF |
|---|---|---|---|
| 3HPP | | | |
| 0.1 wt % | 3.2 | 65 | 62 |
| 0.3 wt % | 9.6 | 67 | 62 |
| Monosodium dihydrogen phosphate | | | |
| 0.1 wt % P:Ti 5,7 | 5.7 | 85 | 82 |
| 0.3 wt % P:Ti 17 | 17 | 75 | 72 |

TABLE 3

TOC (% TOC; total organic carbon emissions) and THF emissions (% THF) for PBT resin described in Example 3 containing a compound of Formula IV, as a percentage of values for control resins without the compound of Formula IV

| Compound of Formula IV 3HPP | Approximate molar ratio of P:Ti | % TOC | % THF |
|---|---|---|---|
| 0.2 wt % | 2.6 | 50 | 49 |
| 0.4 wt % | 5.3 | 49 | 48 |

The invention claimed is:

1. A method for reducing outgassing of tetrahydrofuran (THF) in copolyether ester elastomers having polybutylene terephthalate (PBT) repeat units and polymerized in the presence of a titanium catalyst,
the method comprising the step of:
adding to the copolyether ester elastomer after polymerisation a titanium catalyst deactivating compound,
wherein the titanium catalyst deactivating compound is selected from the group consisting of a compound of Formula IV, salts of Formula IV, a compound of Formula IV', and salts of these,

(IV)

(IV')

wherein $R^1$, $R^2$ and $R^3$ are independently selected from H, OH, OM (wherein M is a positively charged counterion), optionally substituted $C_{1-20}$ alkyl, optionally substituted $C_{2-20}$ alkylene, optionally substituted $C_{6-20}$ aryl, optionally substituted $C_{1-20}$ alkyloxy, polyoxy($C_{2-4}$)alkylene, and optionally substituted $C_{6-20}$ aryloxy, and wherein the optional substituents are independently 1 to 2 in number on any of $R^1$, $R^2$ and $R^3$, and are independently selected from OH, halogen, COOH, COOR$^4$ (wherein $R^4$ is $C_{1-4}$ alkyl) and $NH_2$;
two or more of $R^1$, $R^2$ and $R^3$ can be optionally linked together by a bridge;
with the provisos that for Formula (IV) $R^1$, $R^2$ and $R^3$ are not simultaneously OH, and $R^1$, $R^2$ and $R^3$ are not simultaneously H; and
for Formula (IV'), $R^1$ and $R^2$ are not simultaneously OH.

2. The method of claim 1, wherein $R^1$ is selected from phenyl, ethyl, H, 2-(carboxy)ethyl, polyoxyethylene, hydroxymethyl, di-t-butoxyphenoxy, and ethoxy.

3. The method of claim 1, wherein $R^2$ is selected from phenyl, ethyl, H, 2-(carboxy)ethyl, polyoxyethylene, hydroxymethyl, di-t-butoxyphenoxy, and ethoxy.

4. The method of claim 1, wherein the titanium catalyst deactivating compound is phenyl phosphinate.

5. The method of claim 1, wherein the titanium catalyst deactivating compound is sodium or potassium hypophosphite.

6. The method of claim 1, wherein the titanium catalyst deactivating compound is 3-(hydroxyphenyl phosphinyl) propanoic acid.

7. The method of claim 1, wherein the titanium catalyst deactivating compound is a mono-, di- or tri-salt of phosphoric acid.

8. The method of claim 1, wherein the titanium catalyst deactivating compound is di(polyoxyethylene)hydroxymethyl phosphonate.

9. The method of claim 1, wherein the titanium catalyst deactivating compound is sodium 2,2'-methylenebis-(4,6-di-tert-butylphenyl)phosphate.

10. The method of claim 1, wherein the titanium catalyst deactivating compound is the aluminium salt of diethylphosphinic acid.

11. The method of claim 1, wherein the titanium catalyst deactivating compound is added to the resin at a concentration of at or about 0.01 to 2 wt %.

* * * * *